United States Patent
Seregin et al.

(10) Patent No.: US 11,303,909 B2
(45) Date of Patent: Apr. 12, 2022

(54) SCALING RATIO AND OUTPUT FULL RESOLUTION PICTURE IN VIDEO CODING

(71) Applicant: QUALCOMM Incorporated, San Diego, CA (US)

(72) Inventors: Vadim Seregin, San Diego, CA (US); Muhammed Zeyd Coban, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/017,278

(22) Filed: Sep. 10, 2020

(65) Prior Publication Data

US 2021/0084311 A1    Mar. 18, 2021

Related U.S. Application Data

(60) Provisional application No. 62/902,271, filed on Sep. 18, 2019.

(51) Int. Cl.
*H04N 19/00* (2014.01)
*H04N 19/167* (2014.01)
(Continued)

(52) U.S. Cl.
CPC ......... *H04N 19/167* (2014.11); *H04N 19/176* (2014.11); *H04N 19/186* (2014.11); *H04N 19/31* (2014.11); *H04N 19/503* (2014.11)

(58) Field of Classification Search
CPC .................................................... H04N 19/00
See application file for complete search history.

(56) References Cited

U.S. PATENT DOCUMENTS

| | | | |
|---|---|---|---|
| 2014/0133551 A1* | 5/2014 | Alshina | G06T 3/4007 375/240.03 |
| 2015/0341661 A1* | 11/2015 | Alshina | H04N 19/82 375/240.12 |

OTHER PUBLICATIONS

Bross B., et al., "Versatile Video Coding (Draft 6)", 127. MPEG and 15th JVET Meeting, Jul. 3, 2019-Jul. 12, 2019, Gothenburg, (Motion Picture Expert Group or JVET of ISO/IEC JTC1/SC29/WG11 and ITU-T SG 16 WP 3), No. m49908, JVET-O2001-vE, Jul. 15, 2019 (Jul. 15, 2019), XP030208562, 455 Pages, Retrieved from the Internet: URL: http://phenix.int-evry.fr/mpeg/doc_end_user/documents/127_Gothenburg/wg11/m49908-JVET-O2001-v8-JVET-O2001-v8.zip JVET-O2001-v8.docx [retrieved on Jul. 15, 2019].

(Continued)

*Primary Examiner* — Maryam A Nasri
(74) *Attorney, Agent, or Firm* — Shumaker & Sieffert, P.A.

(57) ABSTRACT

A device is configured to modify, based on chroma phase shifts in a horizontal direction, a horizontal component of a chroma location pointed to by a motion vector of a current block of a current picture. The chroma location is in a reference picture that has a different resolution or a different chroma sampling type from the current picture. The device may modify, based on chroma phase shifts in a vertical direction, a vertical component of the chroma location. Additionally, the device may generate, based on chroma samples of the reference picture corresponding to a modified chroma location chroma samples of a prediction block for a current block of the current picture. The modified chroma location is defined by the modified horizontal and vertical components of the chroma location. The device may code the current block based on the prediction block for the current block.

21 Claims, 7 Drawing Sheets

(51) Int. Cl.
*H04N 19/176* (2014.01)
*H04N 19/31* (2014.01)
*H04N 19/503* (2014.01)
*H04N 19/186* (2014.01)

(56) References Cited

OTHER PUBLICATIONS

Chen J., et al., "Algorithm Description for Versatile Video Coding and Test Model 6 (VTM 6)", 15th Meeting, Joint Video Experts Team (JVET) of ITU-T SG 16 WP 3 and ISO/IEC JTC 1/SC 29/WG 11, JVET-O2002-v2, Gothenburg, SE, Jul. 3-12, 2019, pp. 1-89.

Chen J., et al., "Algorithm Description of Joint Exploration Test Model 1", 1. JVET Meeting, Oct. 19-21, 2015, Geneva (The Joint Video Exploration Team of ISO/IEC JTC1/SC29/WG11 and ITU-T SG.16 WP 3), URL: http://phenix.int-evry.fr/jvet/, No. JVET-A1001, Feb. 24, 2016 (Feb. 24, 2016), XP030150000, 27 Pages.

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Rapaka K., et al., "AHG13: Chroma Phase Offset for SHVC Resampling Process", 16th Meeting, Joint Collaborative Team on Video Coding (JCT-VC) of ITU-T SG 16 WP 3 and ISO/IEC JTC 1/SC 29/WG 11, JCTVC-P0164_v2, San Jose, US, Jan. 9-17, 2014, pp. 1-7.

Seregin V., et al., "AHG8/Non-CE1: Phase Shifts for Resampling", 16th Meeting, Joint Video Experts Team (JVET) of ITU-T SG 16 WP 3 and ISO/IEC JTC 1/SC 29/WG 11, JVET-P0592-v3, Geneva, CH, Oct. 1-11, 2019, pp. 1-8.

Dong J., et al., "Upsampling Based on Sampling Grid Information for Aligned Inter Layer Prediction", JCTVC-M0188r1, Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013, pp. 1-13.

International Search Report and Written Opinion—PCT/US2020/050310—ISA/EPO—dated Dec. 3, 2020 17 Pages.

* cited by examiner

SCALING RATIO AND OUTPUT FULL RESOLUTION PICTURE IN VIDEO CODING

This application claims the benefit of U.S. Provisional Patent Application 62/902,271, filed Sep. 18, 2019, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for determining motion vectors for use with reference picture resampling. As described herein, a video coder, such as a video encoder or a video decoder, may perform inter-prediction to generate a prediction block for a current block of a current picture. The video coder may use samples of a reference picture to generate the prediction block. However, the reference picture may have different resolutions or chroma sampling types from the current picture. Because of the differences in resolutions or chroma phase shifts, the video coder may adjustment a motion vector of the current block (or a location indicated by the motion vector) to indicate a correct position in the reference picture.

In one example, this disclosure describes a method of coding video data includes modifying, based on chroma phase shifts in a horizontal direction, a horizontal component of a chroma location pointed to by a motion vector of a current block of a current picture of the video data, wherein the chroma location is in a reference picture that has a different resolution or a different chroma sampling type from the current picture; modifying, based on chroma phase shifts in a vertical direction, a vertical component of the chroma location; generating, based on chroma samples of the reference picture corresponding to a modified chroma location, chroma samples of a prediction block for the current block, wherein the modified chroma location is defined by the modified horizontal and vertical components of the chroma location; and coding the current block based on the prediction block for the current block.

In another example, this disclosure describes a device for coding video data includes a memory configured to store the video data; and one or more processors implemented in circuitry, the one or more processors configured to: modify, based on chroma phase shifts in a horizontal direction, a horizontal component of a chroma location pointed to by a motion vector of a current block of a current picture of the video data, wherein the chroma location is in a reference picture, wherein the chroma location is in a reference picture that has a different resolution or a different chroma sampling type from the current picture; modify, based on chroma phase shifts in a vertical direction, a vertical component of the chroma location; generate, based on chroma samples of the reference picture corresponding to a modified chroma location, chroma samples of a prediction block for the current block, wherein the modified chroma location is defined by the modified horizontal and vertical components of the chroma location; and code the current block based on the prediction block for the current block.

In another example, this disclosure describes a device for coding video data includes means for modifying, based on chroma phase shifts in a horizontal direction, a horizontal component of a chroma location pointed to by a motion vector of a current block of a current picture of the video data, wherein the chroma location is in a reference picture that has a different resolution or a different chroma sampling type from the current picture; means for modifying, based on chroma phase shifts in a vertical direction, a vertical component of the chroma location; means for generating, based on chroma samples of the reference picture corresponding to a modified chroma location, chroma samples of a prediction block for the current block, wherein the modified chroma location is defined by the modified horizontal and vertical components of the chroma location; and means for coding the current block based on the prediction block for the current block.

In another example, this disclosure describes a computer-readable storage medium having stored thereon instructions that, when executed, cause one or more processors to: modify, based on chroma phase shifts in a horizontal direction, a horizontal component of a chroma location of a motion vector of a current block of a current picture of the video data, wherein the chroma location is in a reference picture that has a different resolution or a different chroma sampling type from the current picture; modify, based on chroma phase shifts in a vertical direction, a vertical component of the motion vector; generate, based on chroma samples of the reference picture corresponding to the location in the reference picture indicated by the motion vector, chroma samples of a prediction block for a current block of the current picture; and code the current block based on the prediction block for the current block.

The details of one or more examples are set forth in the accompanying drawings and the description below. Other features, objects, and advantages will be apparent from the description, drawings, and claims.

DETAILED DESCRIPTION

Figure 1:
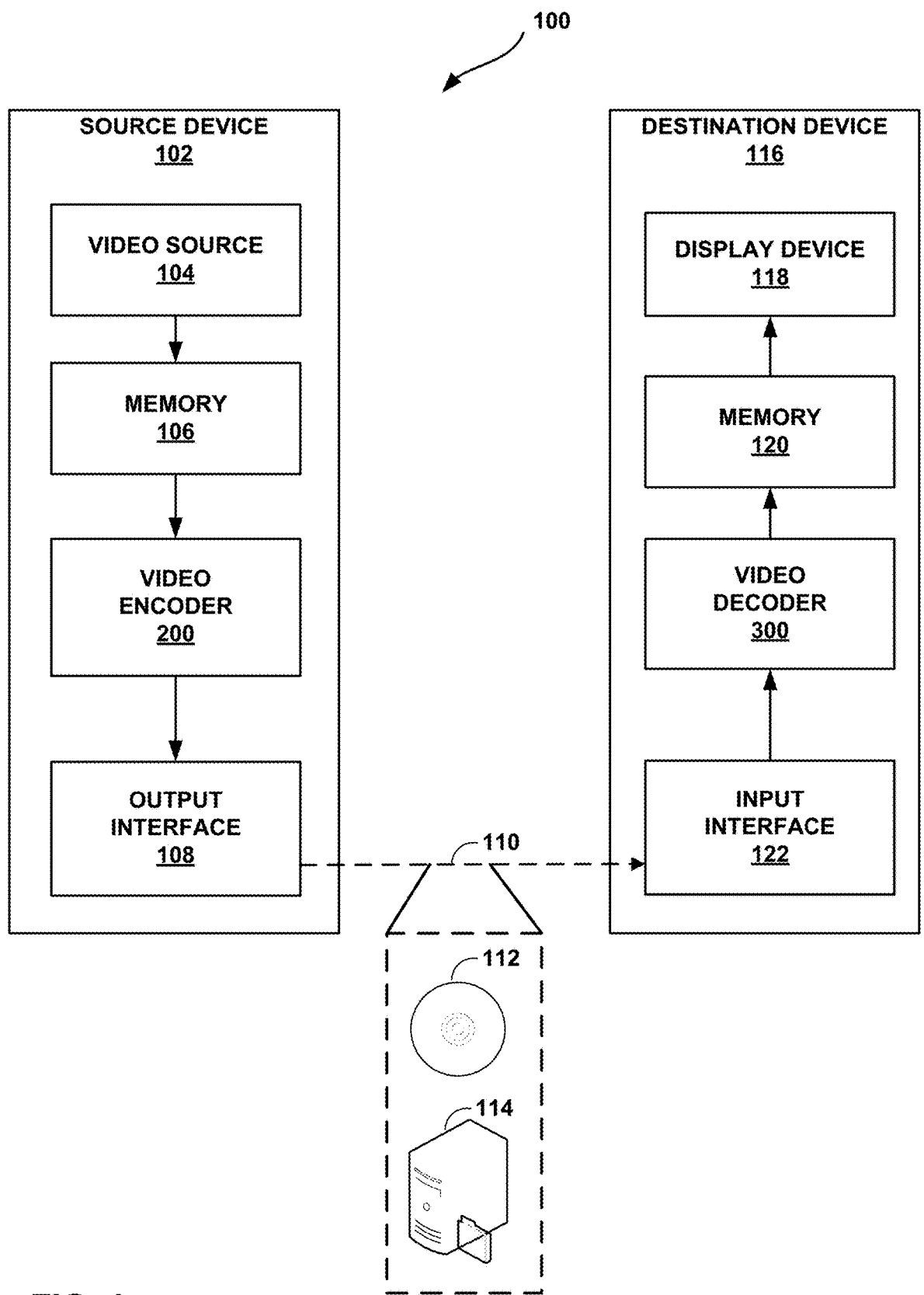
FIG. 1 is a block diagram illustrating an example video encoding and decoding system that may perform the techniques of this disclosure.

A video coder, such as a video encoder or a video decoder, may use inter prediction to generate a prediction block for a current block of a current picture. The video coder may use a motion vector of the current block to determine a location in a reference picture. The video coder may then use samples of the reference picture at the location indicated by the motion vector to generate the prediction block. For instance, in the case where the motion vector indicates a sub-pixel location (i.e., a location between two samples), the video coder may interpolate samples of the prediction block based on the samples of the reference picture. In cases where the video coder is a video encoder, the video encoder may use the prediction block to generate residual data for the current block. The residual data may then be encoded and signaled. In cases where the video coder is a video decoder, the video decoder may use the prediction block and residual data for the current block to reconstruct the current block.

In some examples, the current picture and the reference picture have different resolutions or different chroma sampling types. For example, the current picture and the reference picture may be coded using different chroma formats. For instance, in one example, the current picture may be coded with a 4:2:2 chroma format and the reference picture may be coded with a 4:2:0 chroma format. Thus, in this example, the current picture has twice as many chroma samples in the vertical direction as the reference picture. Such differences in chroma phase shifts may cause motion vectors to indicate inaccurate locations within reference pictures.

Moreover, in pictures coded with the 4:2:0 chroma format, there are different chroma sampling types. In the 4:2:0 chroma format, chroma samples are down-sampled 2:1 relative to luma samples in both the horizontal and vertical directions. The different chroma sampling types correspond to different locations of chroma samples relative to the luma samples. Such differences in chroma sample types between the current picture and the reference picture are not accounted for and may reduce coding efficiency and may reduce picture quality. Thus, the current picture and the reference picture may have different resolutions or chroma sampling types.

This disclosure describes techniques that may address such problems. For instance, in one example, a video coder (e.g., a video encoder or video decoder) may modify, based on chroma phase shifts in a horizontal direction, a horizontal component of a chroma location pointed to by a motion vector of a current block of a current picture. The chroma location is in a reference picture that has a different resolution or a different chroma sampling type from the current picture. Additionally, the video coder may modify, based on chroma phase shifts in a vertical direction, a vertical component of the motion vector. The video coder may generate, based on chroma samples of the reference picture corresponding to a modified chroma location, chroma samples of a prediction block for the current block. The modified chroma location is defined by the modified horizontal and vertical components of the chroma location. The video coder may code (e.g., encode or decode) the current block based on the prediction block for the current block. By modifying the horizontal and vertical components of the chroma location in this way, the video coder may be able to avoid the issues that may arise when the current picture and the reference picture have different resolutions or chroma sampling types.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, mobile devices (e.g., notebook (i.e., laptop) computers, tablet computers, telephone handsets such as smartphones, televisions, cameras, etc.) broadcast receiver devices, set-top boxes, display devices, digital media players, video gaming consoles, video streaming devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for determining motion vectors for use with reference picture resampling. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for determining motion vectors for use with reference picture resampling. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (e.g., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as a "display order") into a coding order for encoding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, computer-readable medium 110 may include storage device 112. Source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, computer-readable medium 110 may include file server 114 or another intermediate storage device that may store the encoded video data generated by source device 102. Source 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A recent draft of the VVC standard is described in Bross, et al. "Versatile Video Coding (Draft 6)," Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019, JVET-O2001-vE (hereinafter "VVC Draft 6"). Chen et al., "Algorithm Description for Versatile Video Coding and Test Model 6," Joint Video Experts Team (JVET) of ITU-T SG 16 WP 3 and ISO/IEC JTC 1/SC 29/WG 11, 15$^{th}$ Meeting: Gothenburg, SE, 3-12 Jul. 2019, JVET-O2002 (hereinafter "VTM-6") describes a test model for VVC Draft 6. The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Motion vectors may have sub-pixel precision. In other words, a motion vector may indicate a location in a reference picture that is between two samples of the reference picture in a horizontal and/or vertical direction. The accuracy of a motion vector refers to how precise a location the motion vector may have with respect to a location in the reference picture. For example, if a motion vector has an accuracy of 16, the motion vector may be able indicate a sample of the reference picture or one of 15 positions between the sample and a next sample of the reference picture. When performing inter-prediction using a motion vector, video encoder 200 or video decoder 300 may apply an interpolation filter to samples of the reference picture to determine samples of a prediction block that corresponds to a location indicated by the motion vector. For instance, if the motion vector indicates a location that is vertically halfway between two samples of the reference picture, video encoder 200 or video decoder 300 may apply an interpolation filter that determines, based on at least the two samples of the reference picture, a value for the location that is vertically halfway between the two samples of the reference picture.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data. Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

A bitstream may comprise a sequence of network abstraction layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units may include a NAL unit header and may encapsulate a RBSP. The NAL unit header may include a syntax element indicating a NAL unit type code. The NAL unit type code specified by the NAL unit header of a NAL unit indicates the type of the NAL unit. A RBSP may be a syntax structure containing an integer number of bytes that is encapsulated within a NAL unit. In some instances, an RBSP includes zero bits.

As noted above, a bitstream may include a representation of encoded pictures of the video data and associated data. The associated data may include parameter sets. NAL units may encapsulate RBSPs for video parameter sets (VPSs), sequence parameter sets (SPSs), and picture parameter sets (PPSs). A VPS is a syntax structure comprising syntax elements that apply to zero or more entire coded video sequences (CVSs). An SPS is also a syntax structure comprising syntax elements that apply to zero or more entire CVSs. An SPS may include a syntax element that identifies a VPS that is active when the SPS is active. Thus, the syntax elements of a VPS may be more generally applicable than the syntax elements of an SPS. A PPS is a syntax structure comprising syntax elements that apply to zero or more coded pictures. A PPS may include a syntax element that identifies an SPS that is active when the PPS is active. A slice header of a slice may include a syntax element that indicates a PPS that is active when the slice is being coded.

Figure 2:
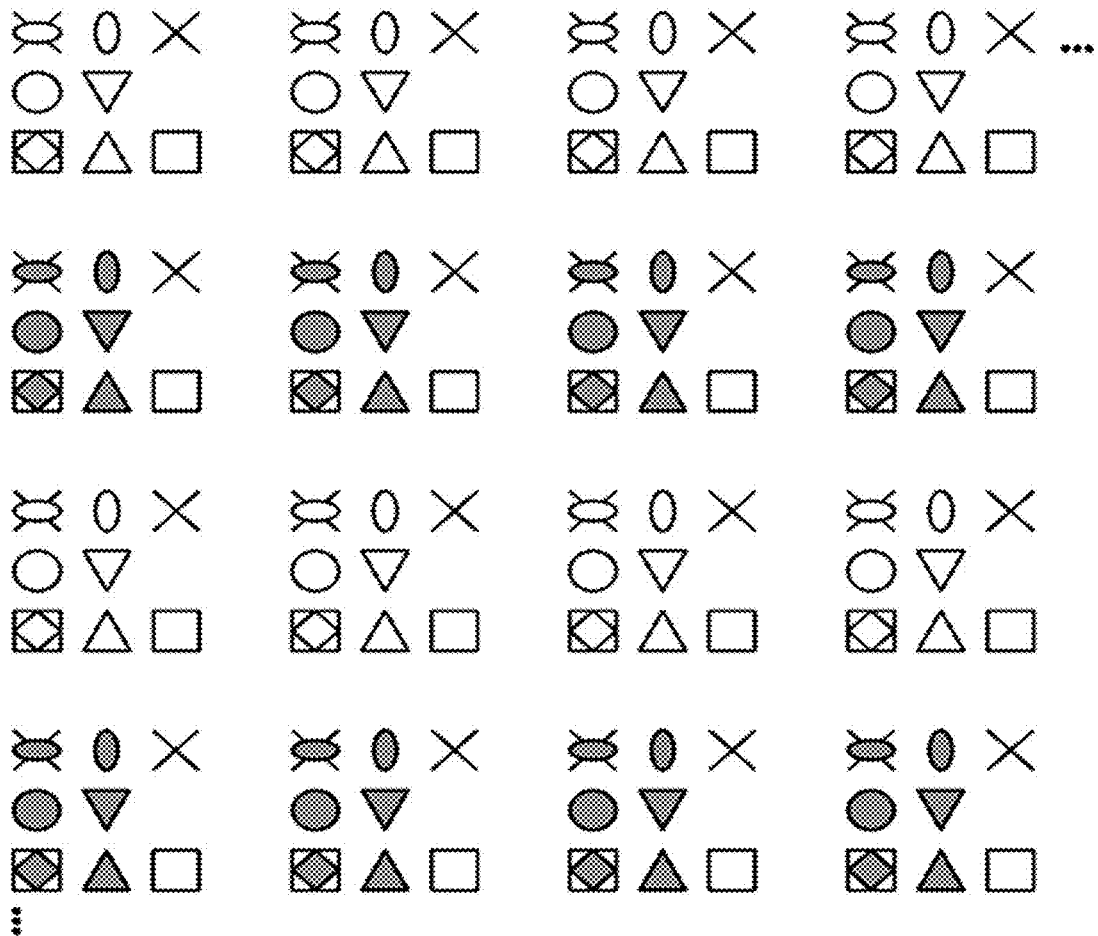
FIG. 2 is a conceptual diagram illustrating example chroma sampling types.

FIG. 2 is a conceptual diagram illustrating example chroma sample location types for a 4:2:0 chroma format. A picture may be divided into a top field and a bottom field. The top field and bottom field may correspond to alternating rows of luma samples. As shown in the example of FIG. 2, there may be six different types of chroma sample arrangements 150 for each field when a picture is encoded using the 4:2:0 chroma format. Although FIG. 2 is explained with reference to field coding, chroma types can be used in frame coding. In examples where frame coding is used, each luma sample of a frame (picture) may be considered to belong to the top field and chroma types 0 through 3 may be used.

Specifically, in the example of FIG. 2, when a picture is encoded using the 4:2:0 chroma format and type 0 chroma samples, every other luma sample location in a row of upper field luma sample locations corresponds to a chroma sample and the chroma sample is horizontally aligned with upper field luma sample locations and vertically aligned midway between the row of upper field luma sample locations and a row of lower field luma sample locations below the row of upper field luma sample locations. When a picture is encoded using the 4:2:0 chroma format and type 0 chroma samples, every other luma sample location in a row of lower field luma sample locations corresponds to a chroma sample and the chroma sample is horizontally aligned with lower field luma sample locations and vertically aligned midway between the row of lower field luma sample locations and a row of upper field luma sample locations above the row of lower field luma sample locations.

When a picture is encoded using the 4:2:0 chroma format and type 1 chroma samples, every other luma sample location in a row of upper field luma sample locations corresponds to a chroma sample and the chroma sample is horizontally aligned between upper field luma sample locations and vertically aligned midway between the row of upper field luma sample locations and a row of lower field luma sample locations below the row of upper field luma sample locations. When a picture is encoded using the 4:2:0 chroma format and type 1 chroma samples, every other luma sample location in a row of lower field luma sample locations corresponds to a chroma sample and the chroma sample is horizontally aligned between lower field luma sample locations and vertically aligned midway between the row of lower field luma sample locations and a row of upper field luma sample locations above the row of lower field luma sample locations.

When a picture is encoded using the 4:2:0 chroma format and type 2 chroma samples, every other luma sample location in a row of upper field luma sample locations corresponds to a chroma sample and the chroma sample is directly aligned with an upper field luma sample location in the row of upper field luma sample locations. When a picture is encoded using the 4:2:0 chroma format and type 2 chroma samples, every other luma sample location in a row of lower field luma sample locations corresponds to a chroma sample and the chroma sample is directly aligned with an upper field luma sample location in a row of upper field luma sample locations above the row of lower field luma sample locations.

When a picture is encoded using the 4:2:0 chroma format and type 3 chroma samples, every other luma sample in a row of upper field luma sample locations corresponds to a chroma sample and the chroma sample is vertically aligned with the row of upper field luma sample locations and midway between upper field luma sample locations. When a picture is encoded using the 4:2:0 chroma format and type 3 chroma samples, every other luma sample in a row of lower field luma sample locations corresponds to a chroma sample that is vertically aligned with a row of upper field luma sample locations that is above the row of lower field luma sample locations and horizontally aligned midway between the lower field luma sample locations.

When a picture is encoded using the 4:2:0 chroma format and type 4 chroma samples, every other luma sample in a row of upper field luma sample locations corresponds to a chroma sample and the chroma sample is aligned with a lower field luma sample location below the corresponding upper field luma sample location. When a picture is encoded using the 4:2:0 chroma format and type 4 chroma samples, every other luma sample in a row of lower field luma sample locations corresponds to a chroma sample and the chroma sample is aligned with a corresponding lower field luma sample location.

When a picture is encoded using the 4:2:0 chroma format and type 5 chroma samples, every other luma sample in a row of upper field luma sample locations corresponds to a chroma sample and the chroma sample is horizontally aligned at a location midway between upper field luma sample locations and vertically aligned with a row of lower field luma sample locations below the row of upper field luma sample locations. When a picture is encoded using the 4:2:0 chroma format and type 5 chroma samples, every other luma sample in a row of lower field luma sample locations corresponds to a chroma sample and the chroma sample is horizontally aligned at a location midway between lower field luma sample locations and vertically aligned with a row of upper field luma sample locations above the row of lower field luma sample locations.

In examples where frame coding is used (i.e., when there are not upper and lower fields), every other luma sample in a column of luma sample locations corresponds to a chroma sample and the chroma sample is vertically and horizontally aligned as described above with respect to the upper field.

VVC Draft 6 introduced reference picture resampling (RPR). RPR allows a current picture and reference pictures to have different resolutions. Thus, in motion compensation, the difference in resolutions is considered during the interpolation filtering by adjusting the interpolation filter phase and reference block start position. Additionally, a scaling ratio is derived for horizontal and vertical directions, based on the current picture and a reference picture widths and heights, and the current picture and reference picture conformance windows. The scaling ratios for the horizontal and vertical directions may be determined based on an output width (PicOutputWidthL) and an output height (PicOutputHeightL) of a picture. In the VTM-6 specification draft, PicOutputWidthL and PicOutputHeightL may be derived as follows:

$$\text{PicOutputWidth}L = \text{pic\_width\_in\_luma\_samples} - \text{Sub-Width}C * (\text{conf\_win\_right\_offset} + \text{conf\_win\_left\_offset}) \quad (7\text{-}43)$$

$$\text{PicOutputHeight}L = \text{pic\_height\_in\_luma\_samples} - \text{SubHeight}C * (\text{conf\_win\_bottom\_offset} + \text{conf\_win\_top\_offset}) \quad (7\text{-}44)$$

In equation (7-43), pic_width_in_luma_samples is a syntax element in a PPS that indicates a width of each decoded picture referring to the PPS in units of luma samples. In equation (7-44), pic_height_in_luma_samples is a syntax element in a PPS that indicates a height of each decoded picture referring to the PPS in units of luma samples. In other words, pic_width_in_luma_samples and pic_height_in_luma_samples are the width and height of a picture. SubWidthC indicates a subsampling rate in the horizontal direction (e.g., SubWidthC equal to 1 indicates no subsampling in the horizontal direction, SubWidthC equal to 2 indicates every other sample is removed in the horizontal direction, etc.). Similarly, SubHeightC indicates a subsampling rate in the vertical direction (e.g., SubHeightC indicates no subsampling in the vertical direction, SubWidthC equal to 2 indicates every other sample is removed in the vertical direction, etc.). The syntax elements conf_win_left_offset, conf_win_right_offset, conf_win_top_offset, and conf_win_bottom_offset specify the samples of the pictures in the CVS that are output from the decoding process, in terms of a rectangular region specified in picture coordinates for output. In other words, conf_win_right_offset, conf_win_left_offset, conf_win_bottom_offset, conf_win_top_offset are the left, right, bottom and top offsets in a conformance window.

In VTM-6, the scaling ratios (i.e., a horizontal scaling ratio (hori_scale_fp) and a vertical scaling ratio (vert_scale_fp)) are derived as follows:

$$\text{hori\_scale\_fp} = ((f\text{RefWidth} << 14) + (\text{PicOutputWidth}L >> 1)) / \text{PicOutputWidth}L \quad (8\text{-}753)$$

$$\text{vert\_scale\_fp} = ((f\text{RefHeight} << 14) + (\text{PicOutputHeight}L >> 1)) / \text{PicOutputHeight}L \quad (8\text{-}754)$$

The variable fRefWidth is set equal to the PicOutputWidthL of the reference picture in luma samples. The variable fRefHeight is set equal to PicOutputHeightL of the reference picture in luma samples. PicOutputWidthL and PicOutputHeightL are the variables derived for a current picture.

The starting position (top left corner) of a block in a reference picture denoted as (xIntL, yIntL) and a filter phase or an offset given in $\frac{1}{16}$-sample units is denoted as (xFracL, yFracL) are derived as follows:

(refxSb$_L$, refySb$_L$) and (refx$_L$, refy$_L$) are luma locations pointed to by a motion vector (refMvLX[0], refMvLX[1]) given in $\frac{1}{16}$-sample units. The variables refxSb$_L$, refx$_L$, refySb$_L$, and refy$_L$ are derived as follows:

$$\text{refxSb}_L = ((x\text{Sb} << 4) + \text{refMvLX}[0]) * \text{hori\_scale\_fp} \quad (8\text{-}755)$$

$$\text{refx}_L = ((\text{Sign}(\text{refxSb}) * ((\text{Abs}(\text{refxSb}) + 128) >> 8) + x_L * ((\text{hori\_scale\_fp} + 8) >> 4)) + 32) >> 6 \quad (8\text{-}756)$$

$$\text{refySb}_L = ((y\text{Sb} << 4) + \text{refMvLX}[1]) * \text{vert\_scale\_fp} \quad (8\text{-}757)$$

$$\text{refy}_L = ((\text{Sign}(\text{refySb}) * ((\text{Abs}(\text{refySb}) + 128) >> 8) + y_L * ((\text{vert\_scale\_fp} + 8) >> 4)) + 32) >> 6 \quad (8\text{-}758)$$

The variables xIntL, yIntL, xFracL and yFracL are derived as follows:

$$x\text{Int}_L = \text{refx}_L >> 4 \quad (8\text{-}759)$$

$$y\text{Int}_L = \text{refy}_L >> 4 \quad (8\text{-}760)$$

$$x\text{Frac}_L = \text{refx}_L \& 15 \quad (8\text{-}761)$$

$$y\text{Frac}_L = \text{refy}_L \& 15 \quad (8\text{-}762)$$

In the text above, (xSb, ySb) specifies the top-left sample of the current coding subblock relative to the top-left luma sample of the current picture, and refMvLX is a motion vector for a reference picture list LX (where X is 0 and 1).

In VVC Draft 6, the same process is repeated for chroma color components as follows.

For each chroma sample location (xC=0 ... sbWidth−1, yC=0 ... sbHeight−1) inside the prediction chroma sample arrays predSamplesLX, the corresponding prediction chroma sample value predSamplesLX[xC][yC] is derived as follows:

(refxSb$_C$, refySb$_C$) and (refx$_C$, refy$_C$) are chroma locations pointed to by a motion vector (mvLX[0], mvLX[1]) given in $\frac{1}{32}$-sample units. The variables refxSb$_C$, refySb$_C$, refx$_C$ and refy$_C$ are derived as follows:

$$\text{refxSb}_C = ((x\text{Sb} / \text{SubWidth}C << 5) + \text{mv}LX[0]) * \text{hori\_scale\_fp} \quad (8\text{-}763)$$

$$\text{refx}_C = ((\text{Sign}(\text{refxSb}_C) * ((\text{Abs}(\text{refxSb}_C) + 256) >> 9) + xC * ((\text{hori\_scale\_fp} + 8) >> 4)) + 16) >> 5 \quad (8\text{-}764)$$

$$\text{refySb}_C = ((y\text{Sb} / \text{SubHeight}C << 5) + \text{mv}LX[1]) * \text{vert\_scale\_fp} \quad (8\text{-}765)$$

$$\text{refy}_C = ((\text{Sign}(\text{refySb}_C) * ((\text{Abs}(\text{refySb}_C) + 256) >> 9) + yC * ((\text{vert\_scale\_fp} + 8) >> 4)) + 16) >> 5 \quad (8\text{-}766)$$

The variables xInt$_C$, yInt$_C$, xFrac$_C$ and yFrac$_C$ are derived as follows:

$$x\text{Int}_C = \text{refx}_C >> 5 \quad (8\text{-}767)$$

$$y\text{Int}_C = \text{refy}_C >> 5 \quad (8\text{-}768)$$

$$x\text{Frac}_C = \text{refx}_C \& 31 \quad (8\text{-}769)$$

$$y\text{Frac}_C = \text{refy}_C \& 31 \quad (8\text{-}770)$$

In VVC Draft 6, chroma has 32 filter phases, while luma has 16 filter phases. In other words, a motion vector may indicate one of 16 positions relative to a luma sample, and the motion vector may indicate one of 32 positions relative to the chroma sample. When a chroma filter phase is derived, i.e., fractional position xFrac$_C$ and yFrac$_C$ considering that resampling is applied, meaning that hori_scale_fp or vert_scale_fp is different from a 1× ratio, it is assumed the zero-phase shift between luma and chroma components grid, as shown in FIG. 2 as type 2 chroma sampling. In this disclosure, the term 1× ratio refers to a 1-to-1 ratio.

However, there can be other chroma types as shown in FIG. 2, which may have different-from-zero phase shifts between luma and chroma components. For example, type 2 chroma sampling has 0 phase shift in the horizontal and vertical directions, type 0 chroma sampling has 0 phase shift in horizontal direction and 0.5 phase shift in the vertical direction, for 1 both horizontal and vertical phase shifts between components are equal to 0.5.

When the interpolation filtering is applied in VVC Draft 6, the phase shifts between components are not considered, i.e., 0 is always assumed, so when such zero-phase filtering is applied to non-type 2 chroma sampling, the results of the filtering will change the chroma sampling type from the original input type, which may be undesirable. Changing the chroma sampling type in this way may affect the coding efficiency, affect the output picture, and/or affect displaying/rendering of the picture because there can be a mismatch between the input picture chroma type and the output picture chroma type.

The techniques of this disclosure are described with respect to frame coding. However, the techniques of this disclosure may also be applicable to frame field coding. In the latter case, any solution of the disclosure may be applied for top and bottom fields individually. For example, if this disclosure describes a syntax element with respect to a frame coding, then a similar syntax element is signaled for a top field and another similar syntax element is signaled for the bottom field.

In accordance with a technique of this disclosure, to solve the chroma sampling type problem, the chroma type or horizontal and vertical chroma phase shifts information may be signaled in a parameter set, such as a VPS, a SPS, a PPS or elsewhere. These phase shifts may indicate the input type for each picture.

Currently in VVC draft 6, a chroma_sample_loc_type_frame syntax element (which is also referred to as a chroma_sample_loc_type syntax element) is signaled in SPS video usability information (VUI) to indicate phase shifts. Because the chroma_sample_loc_type_frame syntax element is signaled in the VUI, a video decoder may ignore the chroma_sample_loc_type_frame syntax element. In examples where field coding is used, similar syntax elements (e.g., chroma_sample_loc_type_top_field and chroma_sample_loc_type_bottom_field) may be signaled for the upper and lower fields.

In one example of this disclosure, the chroma_sample_loc_type_frame syntax element is signaled in a PPS. Thus, the chroma_sample_loc_type_frame syntax element is not signaled in the ignorable VUI portion of the SPS. This is similar to signaling of the chromaphase_idc_syntax element described in Rapaka et. al., "AHG13: chroma phase offset for SHVC resampling process," Joint Collaborative Team on Video Coding (JCT-VC) of ITU-T SG 16 WP 3 and ISO/IEC JTC 1/SC 29/WG 11, 16$^{th}$ Meeting, San Jose, US, 9-17 Jan. 2014, document JCTVC-P0164 (hereinafter, "JCTVC-P0164"), to be signaled in a VPS for an HEVC scalable extension. In JCTVC-P0164, chroma_phase_idc specifies the locations of the chroma sample grids for all pictures referring to the VPS. In JCTVC-P0164, the value of chroma_phase_idc is in the range of 0 to 5, inclusive. In JCTVC-P0164, the variables chroma_phase_X and chroma_phase_Y are derived as follows:

chroma_phase_$X$=chroma_phase_idc==0||chroma_phase_idc==1|| chroma_phase_idc==5 chroma_phase_$Y$=(chroma_phase_idc>>2)?2:(chroma_phase_idc & 0x1)

In another example of this disclosure, the horizontal and vertical phase shifts are signaled explicitly, as for example it is done in HEVC, where those shifts are signaled for each inter-layer reference pictures in PPS extension. For instance, HEVC specifies a phase_hor_chroma_plus8 syntax element and a phase_ver_chroma_plus8 syntax element as follows:

| | |
|---|---|
| phase_hor_chroma_plus8[ ref_loc_offset_layer_id[ i ] ] | ue(v) |
| phase_ver_chroma_plus8[ ref_loc_offset_layer_id[ i ] ] | ue(v) | phase_hor_chroma_plus8[ref_loc_offset_layer_id[i]] minus 8 specifies the chroma phase shift in the horizontal direction used in the resampling of the direct reference layer picture with nuh_layer_id equal to ref_loc_offset_layer_id[i]. The value of phase_hor_chroma_plus8[ref_loc_offset_layer_id[i]] shall be in the range of 0 to 63, inclusive. When not present, the value of phase_hor_chroma_plus8[ref_loc_offset_layer_id[i]] is inferred to be equal to 8.
phase_ver_chroma_plus8[ref_loc_offset_layer_id[i]] minus 8 specifies the chroma phase shift in the vertical direction used in the resampling process of the direct reference layer picture with nuh_layer_id equal to ref_loc_offset_layer_id[i]. The value of phase_ver_chroma_plus8[ref_loc_offset_layer_id[i]] shall be in the range of 0 to 63, inclusive. When not present, the value of phase_ver_chroma_plus8[ref_loc_offset_layer_id[i]] is inferred as follows:
If chroma_format_idc is equal to 3 (4:4:4 chroma format), the value of phase_ver_chroma_plus8[ref_loc_offset_layer_id[i]] is inferred to be equal to 8.
Otherwise, the value of phase_ver_chroma_plus8[ref_loc_offset_layer_id[i]] is inferred to be equal to (4*scaledRefRegHeight+refRegHeight/2)/refRegHeight+4, where the value of scaledRefRegHeight is equal to the value of ScaledRefRegionHeightInSamplesY derived for the direct reference layer picture with nuh_layer_id equal to ref_loc_offset_layer_id[i] of the picture that refers to this PPS, and the value of refRegHeight is equal to RefLayerRegionHeightInSamplesY derived for the direct reference layer picture with nuh_layer_id equal to ref_loc_offset_layer_id[i] of the picture that refers to this PPS.

PhaseHorC=phase_hor_chroma_plus8[$rLId$]−8      (H-24)

PhaseVerC=phase_ver_chroma_plus8[$rLId$]−8      (H-25)

In accordance with one or more techniques of this disclosure, the phase shifts indicate the chroma sampling type of each picture. In one example, the phase shifts indicate that a given picture has this certain chroma type, the other picture may have a different type in the same sequence. In another example, such chroma phase shifts information may be signalled in a SPS. In this example, the chroma phase shifts information indicates that all pictures have that particular chroma type.

Additionally, in some examples of this disclosure, it may be always assumed and constrained in the resampling (down-sampling or up-sampling) process that the chroma type is kept unchanged across all pictures in a video sequence, and when the resampling process is applied the required chroma phase shifts are derived for each picture, the phase shifts may be different for each picture, to keep that chroma type unchanged. The chroma type may be indicated as described in the above examples. The picture may be an input picture, a current picture, a reference picture, or an output picture.

A chroma phase shift may be signalled as a positive value. However, the sign of the phase shift may be derived based on whether down-sampling (for example, a scaling ratio less than 1x) or up-sampling (for example, a scaling ratio greater than 1x) is applied. In one example, the sign of a chroma phase shift is positive if down-sampling is applied and is negative if up-sampling is applied for either a horizontal or a vertical direction. In some examples, it may be the case that down-sampling is applied in one direction and up-sampling is applied in another direction.

It could be the case that a current picture and a reference picture have different chroma phase shifts. In the case that the current picture and the reference picture have different chroma phase shifts, both current and reference phase shifts are used in the filtering and resampling process.

In both examples (i.e., the case that down-sampling is applied in one direction and up-sampling is applied in another direction (e.g., different resolutions) and the case that the current picture and the reference picture have different chroma phase shifts), the chroma phase shift information is used in the interpolation filtering process, which considers only zero-phase shift. However, the chroma phase shift information may only be considered when resampling is applied, i.e., hori_scale_fp or vert_scale_fp is different from a 1x ratio. It means that the signalled chroma phase shift information is conditionally applied in the filtering, i.e.

chroma_phase_X is used if hori_scale_fp is different from 1× ratio, and chroma_phase_Y is used if vert_scale_fp is different from 1× ratio.

It should be noted that when the chroma format is not 4:2:0 (e.g., when chroma_format_idc is not equal to 4:2:0), such as 4:2:2 or 4:4:4, chroma subsampling is not applied in the vertical direction (4:2:2) or chroma subsampling is not applied at all (4:4:4). In VVC Draft 6, the chroma_format_idc syntax element indicates a chroma sampling format (i.e., a chroma format). In some examples where the chroma format is not 4:2:0, (e.g., chroma_format_idc is not equal to 4:2:0), the techniques of this disclosure are not applied for vertical filtering for 4:2:2 format or not applied for both horizontal and vertical filtering for 4:4:4 format or monochrome format.

TABLE 1 chroma_format_idc and separate_colour_plane_flag

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

Video decoder 300 may use Table 1, above, to determine a chroma format, SubWidthC, and SubHeightC based on a chroma_format_idc syntax element and a separate_colour_plane_flag syntax element that may be signaled in a bitstream. The separate_colour_plane_flag syntax element equal to 1 specifies that the three colour components of the 4:4:4 chroma format are coded separately. The separate_colour_plane_flag equal to 0 specifies that the colour components are not coded separately. For example, if the chroma_format_idc syntax element is equal to 3 and the separate_colour_plane_flag syntax element is equal to 0, the chroma format is 4:4:4, SubWidthC is equal to 1, and SubHeightC is equal to 1.

In one implementation example, refxSb$_C$, refx$_C$, refySb$_C$, refy$_C$ are modified to consider chroma phase shift as shown in Table 2, below, where text enclosed in <!> . . . </!> tags is added to VVC Draft 6:

TABLE 2 refxSbc = ( ( xSb / SubWidthC << 5 ) + mvLX[ 0 ] ) * hori_scale_fp <!>+ addX</!>
refxc = ( ( Sign( refxSbc ) * ( ( Abs( refxSbc ) + 256 ) >> 9)
+ xC * ( ( hori_scale_fp + 8 ) >> 4 ) ) + 16 ) >> 5
refySbc = ( ( ySb / SubHeightC << 5 ) + mvLX[ 1 ] ) * vert_scale_fp <!>+
addY</!>
refyc = ( ( Sign( refySbc ) * ( ( Abs( refySbc ) + 256 ) >> 9)
+ yC* ( ( vert_scale_fp + 8 ) >> 4 ) ) + 16 ) >> 5

In Table 2, addX is set based on the chroma phase shifts in the horizontal direction and addY is set based on the chroma phase shifts in the vertical direction. In one example, chroma phase shifts include a chroma phase shift for a current picture and a chroma phase shift for a reference picture.

In a more detailed example, if a horizontal scaling ratio (hori_scale_fp) is equal to a 1× ratio or chroma_format_idc is equal to 3 or 0, then addX is set equal to 0. Otherwise, if the horizontal scaling ratio is not equal to a 1× ratio and chroma_format_idc is not equal to 3 and not equal to 1, addX is set based on the chroma phase shifts in the horizontal direction. If a vertical scaling ratio (vert_scale_fp) is equal to a 1× ratio or chroma_format_idc is equal to 2, 3 or 0, then addY is set equal to 0. Otherwise, if the vertical scaling ratio is not equal to the 1× ratio and chroma_format_idc not equal to 2, not equal to 3, and not equal to 0, addY is set based on the chroma phase shifts in the vertical direction. The values addX and addY may be set as described in the following examples.

In some examples, addX and addY are set (e.g., by video encoder 200 and video decoder 300) based on the chroma phase shifts as shown in the example of Table 3, below:

TABLE 3 addX = ( chroma_phase_X * hori_scale_fp − (1 << 14 ) *
ref_chroma_phase_X + 2 ) >> 2
addY = ( chroma_phase_Y * vert_scale_fp − (1 << 14 ) *
ref_chroma_phase_Y + 2 ) >> 2
addX = addX << 5
addY = addY << 5

In the equations of Table 3, (1<<14) is an accuracy factor for horizontal and vertical scaling. Furthermore, in the equations of Table 3, the right shift by 2 (division by 4) comes from the definition of chroma_phase_X and chroma_phase_Y, which have accuracy factors of 2 (i.e., 1 corresponds to 0.5 shift) and the chroma subsampling ratio relative to the luma, which is 2 in 4:2:0 format. addX and addY are right shifted by 5 because of the number of chroma fraction positions, which is 32, which is the same as chroma MV accuracy.

Considering other chroma formats such 4:2:2 and 4:4:4, the above formulas, in one example, can be modified to include chroma subsampling ratio SubWidthC and SubHeightC as shown in the example of Table 4, below:

TABLE 4 addX = ( chroma_phase_X * hori_scale_fp − (1 << 14 ) *
ref_chroma_phase_X + SubWidthC ) >> SubWidthC
addY = ( chroma_phase_Y * vert_scale_fp − (1 << 14 ) *
ref_chroma_phase_Y + SubHeightC ) >>SubHeightC
addX = addX << 5
addY = addY << 5

In the formulas of Table 4, division by 4 (right shift by 2) is replaced with division by 2 for cases when there is no chroma subsampling in the horizontal or vertical directions, respectively. That is, as shown in Table 4, the value of SubWidthC may be equal to 1 in cases where there is no horizontal subsampling and may be equal to 2 in cases where there is horizontal subsampling. Thus, division by 2 or 4 occurs depending on whether there is horizontal subsampling. Likewise, the value of SubHeightC may be equal to 1 in cases where there is no vertical subsampling and may be equal to 2 in cases where there is vertical subsampling. Thus, division by 2 or 4 occurs depending on whether there is vertical subsampling.

Other numbers of fraction positions can be used, and so the right shift can be different depending on the number of fraction positions, and other accuracy representations may be used for the scaling factor and the phases. In general, the formulas of Table 3 and Table 4 are just an example of integer implementation, and other similar formulas can be used.

In some examples, the last two steps of the equations in Table 3 and Table 4 can be combined by consolidating the shifts (5-2) as shown in Table 5, below:

TABLE 5 addX = ( chroma_phase_X * hori_scale_fp − (1 << 14 ) *
ref_chroma_phase_X ) << 3
addY = ( chroma_phase_Y * vert_scale_fp − (1 << 14 ) *
ref_chroma_phase_Y ) << 3

In the examples of Tables 3, 4, and 5, chroma_phase_X and chroma_phase_Y may be the chroma phase shifts of the current (after resampling) picture, while ref chroma_phase_X and ref chroma_phase_Y may be the chroma phase shifts of the reference (before resampling) picture.

If the chroma phase has an accuracy of 16, then the above formulas are rewritten as shown in the example of Table 6, below:

TABLE 6 addX = chroma_phase_X * hori_scale_fp − (1 << 14 ) *
ref_chroma_phase_X
addY = chroma_phase_Y * vert_scale_fp − (1 << 14 ) *
ref_chroma_phase_Y When considering other chroma formats (e.g., 4:2:2 and 4:4:4), video encoder 200 and video decoder 300 may calculate addX and addY according to the following formulas in Table 7:

TABLE 7 addX = ( chroma_phase_X * hori_scale_fp − (1 << 14 ) *
ref_chroma_phase_X ) * 2 / SubWidthC
addY = ( chroma_phase_Y * vert_scale_fp − (1 << 14 ) *
ref_chroma_phase_Y ) * 2 / SubHeightC In another example, instead of dividing by SubWidthC and SubHeightC, the horizontal and vertical chroma phase value can be scaled by SubWidthC and SubHeightC. The scaling can be done before phase signaling or after phase signaling. In the first case (i.e., in examples where the scaling is performed before phase signaling), the smaller magnitude value is signaled, which may be advantageous because fewer bits may be needed to signal the smaller magnitude value than the larger magnitude value.

In another example, if the chroma phase has an accuracy of 32, the formulas can be rewritten as shown in Table 8, below:

TABLE 8 addX = ( chroma_phase_X * hori_scale_fp − (1 << 14 ) *
ref_chroma_phase_X + 1 ) >> 1
addY = ( chroma_phase_Y * vert_scale_fp − (1 << 14 ) *
ref_chroma_phase_Y + 1 ) >> 1

In some examples, a fixed chroma phase may be used. In other words, the chroma phase is always the same and accordingly is not signaled. For example, the chroma phase corresponding to chroma sample type 0 may be used because chroma sample type 0 may be the most commonly used chroma format. In this example, chroma_phase_X=ref chroma_phase_X=0, chroma_phase_Y=ref chroma_phase_Y=1.

In another example, the current chroma phase can be fixed, but the reference chroma phase is signaled. In yet another example, the reference chroma phase may be fixed, but the current chroma phase is signaled.

Thus, in accordance with the techniques of this disclosure, a video coder (e.g., video encoder 200 or video decoder 300) may modify, based on chroma phase shifts in a horizontal direction, a horizontal component of a chroma location pointed to by a motion vector of a current block of a current picture of the video data. The chroma location is in a reference picture that has a different resolution or a different chroma sampling type from the current picture. The video coder may also modify, based on chroma phase shifts in a vertical direction, a vertical component of the chroma location. Furthermore, the video coder may generate, based on chroma samples of the reference picture corresponding to a modified chroma location, chroma samples of a prediction block for a current block of the current picture. The modified chroma location is defined by the modified horizontal and vertical components of the chroma location. The video coder may code the current block based on the prediction block for the current block.

Similar methods can be applied to luma phase. The phase shift for luma may happen, for example, when down-sampling may be done outside of the codec (in one example, for the input picture to be encoded), and non-zero phase alignment in the down-sampling may be utilized. Similarly, the up-sampling filtering may be used outside of the codec (in one example, for displaying), and non-zero phase alignment filtering may be applied. In those examples, the mismatch in luma phase between the input/output picture and encoded or reference picture may happen.

To avoid this phase mismatch, luma phases may be signaled and may be used in the filtering process. In one example, signaling of the luma phases may be done using HEVC syntax. In HEVC, luma phases are signaled only for inter-layer pictures (i.e., pictures that are dependent on pictures in different layers). However, in accordance with an example of this disclosure, the HEVC syntax for signaling luma phases may be applied with respect to a current picture and not only to inter-layer pictures. The HEVC syntax and semantics for signaling luma phases are presented below.

| | |
|---|---|
| phase_hor_luma[ ref_loc_offset_layer_id[ i ] ] | ue(v) |
| phase_ver_luma[ ref_loc_offset_layer_id[ i ] ] | ue(v) | phase_hor_luma[ref_loc_offset_layer_id[i]] specifies the luma phase shift in the horizontal direction used in the resampling process of the direct reference layer picture with nuh_layer_id equal to ref_loc_offset_layer_id[i]. The value of phase_hor_luma[ref_loc_offset_layer_id[i]] shall be in the range of 0 to 31, inclusive. When not present, the value of phase_hor_luma[ref_loc_offset_layer_id[i]] is inferred to be equal to 0.

phase_ver_luma[ref_loc_offset_layer_id[i]] specifies the luma phase shift in the vertical direction used in the resampling of the direct reference layer picture with nuh_layer_id equal to ref_loc_offset_layer_id[i]. The value of phase_ver_luma[ref_loc_offset_layer_id[i]] shall be in the range of 0 to 31, inclusive. When not present, the value of phase_ver_luma[ref_loc_offset_layer_id[i]] is inferred to be equal to 0.

In other examples, luma phases may be signaled on other ways. For example, luma phases may be signaled using a luma_phase_idc syntax element which is similar to the chromaphase_idc_syntax element discussed above. The luma_phase_idc syntax element indicates the position shift between one picture relative to another one, such as a current picture and a reference picture. Luma phases may be derived from luma_phase_idc (e.g., in the same way that chroma phases are derived from the chromaphase_idc_syntax element).

Horizontal and vertical luma phase shifts information may be signaled in a parameter set, such as a VPS, a SPS, a PPS, or elsewhere. The phase shifts may indicate the input type for each picture. The horizontal and vertical luma phase shifts can be signaled in the same parameter set as the chroma phase shifts, such as a PPS. In another example, the horizontal and vertical luma phases may be signaled in a higher parameter set, such as a SPS or a VPS, while chroma phase shifts are signaled in a PPS. The idea behind signaling the horizontal and vertical luma phase shifts in a higher parameter set is that luma phase shifts may be a global position shift characteristic for an entire video sequence, while chroma phase shifts may be more specific for a picture.

Modifications similar to those performed in the chroma filter (e.g., in equations of tables 3-8) may be performed in the luma filtering, considering luma phases of a current picture and a reference picture, as was already explained for chroma. The luma modification is applied (e.g., video encoder 200 and video decoder 300) when scaling factor is different from a 1× ratio, i.e., a reference picture and a current picture have different either width or height or both.

$$refxSb_L=((xSb<<4)+refMvLX[0])*\text{hori\_scale\_}fp<!>+\text{add}X</!> \quad (8\text{-}755)$$

$$refx_L=((\text{Sign}(refxSb)*((\text{Abs}(refxSb)+128)>>8)+x_L*((\text{hori\_scale\_}fp+8)>>4))+32)>>6 \quad (8\text{-}756)$$

$$refySb_L=((ySb<<4)+refMvLX[1])*\text{vert\_scale\_}fp<!>+\text{add}Y</!> \quad (8\text{-}757)$$

$$refy_L=((\text{Sign}(refySb)*((\text{Abs}(refySb)+128)>>8)+y_L*((\text{vert\_scale\_}fp+8)>>4))+32)>>6 \quad (8\text{-}758)$$

In a more detailed example, if hori_scale_fp is equal to a 1× ratio then addX is set equal to 0, otherwise addX is set based on the luma phase shifts in the horizontal direction. If vert_scale_fp is equal to a 1× ratio then addY is set equal to 0; otherwise, addY is set based on the luma phase shifts in the vertical direction, e.g., as shown in Table 9, below.

TABLE 9 addX = ( chroma_phase_X * hori_scale_fp − (1 << 14 ) * ref_chroma_phase_X + 1 ) >> 1
addY = ( chroma_phase_Y * vert_scale_fp − (1 << 14 ) * ref_chroma_phase_Y + 1 ) >> 1
addX = addX << 4
addY = addY << 4 where (1<<14) is the accuracy factor for horizontal and vertical scaling, a right shift by 1 (i.e., division by 2) comes from the definition of chroma_phase_X and chroma_phase_Y, which have an accuracy factor of 2 (i.e., 1 corresponds to 0.5 shift), it is right shifted by 4 because of the number of luma fraction positions, which is 16, same as luma MV accuracy.

In other examples, addX and addY are set based on the luma phase shifts as shown in Table 10, below:

TABLE 10 addX = phase_hor_luma * hori_scale_fp − (1 << 14 ) * ref_phase_hor_luma
addY = phase_ver_luma * vert_scale_fp − (1 << 14 ) * ref_phase_ver_luma In this example, it is considered that the luma phase has an accuracy factor of 16. The same remark can be applied that some of the luma phases can be fixed (either current or reference), in another example one may be fixed and another one is signaled.

The accuracy of luma phase and chroma phase can be different, for example the accuracy of luma phase is 8, however the accuracy of the chroma phase may be 16. In this example, 0.5 shift in luma corresponds to 4, and 0.5 shift in chroma corresponds to 8. The accuracy factor of luma and chroma may be set the same as the number of fractions in the luma and chroma motion interpolation filters, respectively.

Thus, in some examples, the video coder may modify, based on luma phase shifts in a horizontal direction, a horizontal component of a luma location pointed to by a motion vector of a current block of a current picture. The luma location is in a reference picture that has a different resolution or a different chroma sampling type from the current picture. The video coder may also modify, based on luma phase shifts in a vertical direction, a vertical component of luma location. Furthermore, the video coder may generate, based on luma samples of the reference picture corresponding to a modified luma location, luma samples of a prediction block for the current block. The modified luma location is defined by the modified horizontal and vertical components of the luma location. The video coder may code the current block based on the prediction block for the current block.

The following section of this disclosure describes an example solution for luma and chroma using VVC Draft 6 with an accuracy factor of 16 for both luma and chroma phases. The text added to VVC Draft 6 is indicated by <!> . . . </!> tags. A subset of the example solution is also can be used (e.g., only chroma phase offsets or only pre-defined fixed phase offsets).

| pic_parameter_set_rbsp( ) { | Descriptor |
|---|---|
| . . . | |
| <!> resample_phase_set_present_flag | u(1) |
|   if( resample_phase_set_present_flag ) { | |
|     phase_hor_luma | ue(v) |
|     phase_ver_luma | ue(v) |
|     phase_hor_chroma | ue(v) |
|     phase_ver_chroma | ue(v) |
|   }</!> | |
| . . . | |

<!>resample_phase_set_present_flag equal to 1 specifies that the resampling phase set is present in the PPS. resample_phase_set_present_flag equal to 0 specifies that the resampling phase set is not present in the PPS.

The resampling phase set specifies the phase offsets used in resampling process of a picture referring to the PPS.

phase_hor_luma specifies the luma phase shift in the horizontal direction used in the resampling process. The value of phase_hor_luma shall be in the range of 0 to 31, inclusive. When not present, the value of phase_hor_luma is inferred to be equal to 0.

phase_ver_luma specifies the luma phase shift in the vertical direction used in the resampling process. The value of phase_ver_luma shall be in the range of 0 to 31, inclusive. When not present, the value of phase_ver_luma is inferred to be equal to 0.

phase_hor_chroma specifies the chroma phase shift in the horizontal direction used in the resampling process. The value of phase_hor_chroma shall be in the range of 0 to 63, inclusive. When not present, the value of phase_hor_chroma is inferred to be equal to 0.

phase_ver_chroma specifies the chroma phase shift in the vertical direction used in the resampling process. The value of phase_ver_chroma shall be in the range of 0 to 63, inclusive. When not present, the value of phase_ver_chroma is inferred equal to 0 if chroma_format_idc is equal to 3 (4:4:4 chroma format), or equal to 8, otherwise.</!>
8.5.6.3 Fractional Sample Interpolation Process
8.5.6.3.1 General
  Inputs to this process are:
    a luma location (xSb, ySb) specifying the top-left sample of the current coding subblock relative to the top-left luma sample of the current picture,
    a variable sbWidth specifying the width of the current coding subblock,
    a variable sbHeight specifying the height of the current coding subblock,
    a motion vector offset mvOffset,
    a refined motion vector refMvLX,
    the selected reference picture sample array refPicLX,
    the half sample interpolation filter index hpelIfIdx,
    the bi-directional optical flow flag bdofFlag,
    a variable cIdx specifying the colour component index of the current block.
  Outputs of this process are:
    an (sbWidth+brdExtSize)×(sbHeight+brdExtSize) array predSamplesLX of prediction sample values.
  The prediction block border extension size brdExtSize is derived as follows:

brdExtSize=(bdofFlag||(inter_affine_flag[xSb][ySb] && sps_affineprof_enabled_flag))?2:0    (8-752)

The variable fRefWidth is set equal to the PicOutputWidthL of the reference picture in luma samples.
  The variable fRefHeight is set equal to PicOutputHeightL of the reference picture in luma samples.
  The motion vector mvLX is set equal to (refMvLX−mvOffset).
  If cIdx is equal to 0, the following applies:
    The scaling factors and their fixed-point representations are defined as hori_scale_fp=((fRefWidth<<14)+(PicOutputWidthL>>1))/PicOutputWidthL    (8-753)

vert_scale_fp=((fRefHeight<<14)+(PicOutputHeightL>>1))/PicOutputHeightL    (8-754)

Let (xIntL, yIntL) be a luma location given in full-sample units and (xFracL, yFracL) be an offset given in 1/16-sample units. These variables are used only in this clause for specifying fractional-sample locations inside the reference sample arrays refPicLX.
  The top-left coordinate of the bounding block for reference sample padding (xSbInt$_L$, ySbInt$_L$) is set equal to (xSb+(mvLX[0]>>4), ySb+(mvLX[1]>>4)).
  For each luma sample location (x$_L$=0 . . . sbWidth−1+brdExtSize, y$_L$=0 . . . sbHeight−1+brdExtSize) inside the prediction luma sample array predSamplesLX, the corresponding prediction luma sample value predSamplesLX[x$_L$][y$_L$] is derived as follows:
    Let (refxSb$_L$, refySb$_L$) and (refx$_L$, refy$_L$) be luma locations pointed to by a motion vector (refMvLX[0], refMvLX[1]) given in 1/16-sample units. The variables refxSb$_L$, refx$_L$, refySb$_L$, and refy$_L$ are derived as follows:

<!>ref_phase_hor_luma is set equal to phase_hor_luma of refPicLX,ref_phase_ver_luma is set equal to phase_ver_luma of refPicLX.

addX=hori_scale_fp==(1<<14)?0:
        phase_hor_luma*hori_scale_fp−
        (1<<14)*ref_phase_hor_luma addY=vert_scale_fp(1<<14)?0:
        phase_ver_luma*vert_scale_fp−(1<<14)*
        ref_phase_ver_luma</!> refxSb$_L$=((xSb<<4)+refMvLX[0])*hori_scale_fp<!>+addX</!>    (8-755)

refx$_L$=((Sign(refxSb)*((Abs(refxSb)+128)>>8)+x$_L$*
        ((hori_scale_fp+8)>>4))+32)>>6    (8-756)

refySb$_L$=((ySb<<4)+refMvLX[1])*vert_scale_fp<!>+addY</!>    (8-757)

refyL=((Sign(refySb)*((Abs(refySb)+128)>>8)+yL*
        ((vert_scale_fp+8)>>4))+32)>>6    (8-758)

The variables xInt$_L$, yInt$_L$, xFrac$_L$ and yFrac$_L$ are derived as follows:

xInt$_L$=refx$_L$>>4    (8-759)

yInt$_L$=refy$_L$>>4    (8-760)

xFrac$_L$=refx$_L$&15    (8-761)

yFrac$_L$=refy$_L$&15    (8-762)

If bdofFlag is equal to TRUE or (sps_affine_prof_enabled_flag is equal to TRUE and inter_affine_flag[xSb][ySb] is equal to TRUE), and one or more of the following conditions are true, the prediction luma sample value predSamplesLX[x$_L$][y$_L$] is derived by invoking the luma integer sample fetching process as specified in clause 8.5.6.3.3 with (xInt$_L$+(xFrac$_L$>>3)−1), yInt$_L$+(yFrac$_L$>>3)−1) and refPicLX as inputs.
      x$_L$ is equal to 0.
      x$_L$ is equal to sbWidth+1.
      y$_L$ is equal to 0.
      y$_L$ is equal to sbHeight+1.
    Otherwise, the prediction luma sample value predSamplesLX[xL][yL] is derived by invoking the luma sample 8-tap interpolation filtering process as specified in clause 8.5.6.3.2 with (xIntL−(brdExtSize>0? 1:0), yIntL−(brdExtSize>0? 1:0)), (xFracL, yFracL), (xSbInt$_L$, ySbInt$_L$), refPicLX, hpelIfIdx, sbWidth, sbHeight and (xSb, ySb) as inputs.
  Otherwise (cIdx is not equal to 0), the following applies:
  Let (xIntC, yIntC) be a chroma location given in full-sample units and (xFracC, yFracC) be an offset given in 1/32 sample units. These variables are used only in this clause for specifying general fractional-sample locations inside the reference sample arrays refPicLX.
  The top-left coordinate of the bounding block for reference sample padding (xSbIntC, ySbIntC) is set equal to ((xSb/SubWidthC)+(mvLX[0]>>5), (ySb/SubHeightC)+(mvLX[1]>>5)).
  For each chroma sample location (xC=0 . . . sbWidth−1, yC=0 . . . sbHeight−1) inside the prediction chroma sample arrays predSamplesLX, the corresponding prediction chroma sample value predSamplesLX[xC][yC] is derived as follows:
    Let (refxSb$_C$, refySb$_C$) and (refx$_C$, refy$_C$) be chroma locations pointed to by a motion vector (mvLX[0], mvLX[1]) given in 1/32-sample units. The variables refxSb$_C$, refySb$_C$, refx$_C$ and refy$_C$ are derived as follows:

<!>ref_phase_hor_chroma is set equal to phase_hor_luma of refPicLX,ref_phase_ver_chroma is set equal to phase_ver_luma of refPicLX.

$$addX = \text{hori\_scale\_}fp == (1<<14) ? 0 :$$
$$(\text{phase\_hor\_chroma} * \text{hori\_scale\_}fp - (1<<14) * \text{ref\_phase\_ver\_chroma}) * 2 / \text{SubWidth}C$$

$$addY = \text{vert\_scale\_}fp == (1<<14) ? 0 :$$
$$(\text{phase\_ver\_chroma} * \text{vert\_scale\_}fp - (1<<14) * \text{ref\_phase\_ver\_chroma}) * 2 / \text{SubHeight}C </!>$$

$$\text{ref}xSb_C = ((xSb / \text{SubWidth}C << 5) + mvLX[0]) * \text{hori\_scale\_}fp <!> + addX </!> \quad (8\text{-}763)$$

$$\text{ref}x_C = ((\text{Sign}(\text{ref}xSb_C) * ((\text{Abs}(\text{ref}xSb_C) + 256) >> 9) + xC * ((\text{hori\_scale\_}fp + 8) >> 4)) + 16) >> 5 \quad (8\text{-}764)$$

$$\text{ref}ySb_C = ((ySb / \text{SubHeight}C << 5) + mvLX[1]) * \text{vert\_scale\_}fp <!> + addY </!> \quad (8\text{-}765)$$

$$\text{ref}y_C = ((\text{Sign}(\text{ref}ySb_C) * ((\text{Abs}(\text{ref}ySb_C) + 256) >> 9) + yC * ((\text{vert\_scale\_}fp + 8) >> 4)) + 16) >> 5 \quad (8\text{-}766)$$

The variables $xInt_C$, $yInt_C$, $xFrac_C$ and $yFrac_C$ are derived as follows:

$$xInt_C = \text{ref}x_C >> 5 \quad (8\text{-}767)$$

$$yInt_C = \text{ref}y_C >> 5 \quad (8\text{-}768)$$

$$xFrac_C = \text{ref}y_C \& 31 \quad (8\text{-}769)$$

$$yFrac_C = \text{ref}y_C \& 31 \quad (8\text{-}770)$$

The prediction sample value predSamplesLX[xC][yC] is derived by invoking the process specified in clause 8.5.6.3.4 with (xIntC, yIntC), (xFracC, yFracC), (xSbIntC, ySbIntC), sbWidth, sbHeight and refPicLX as inputs.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 3:
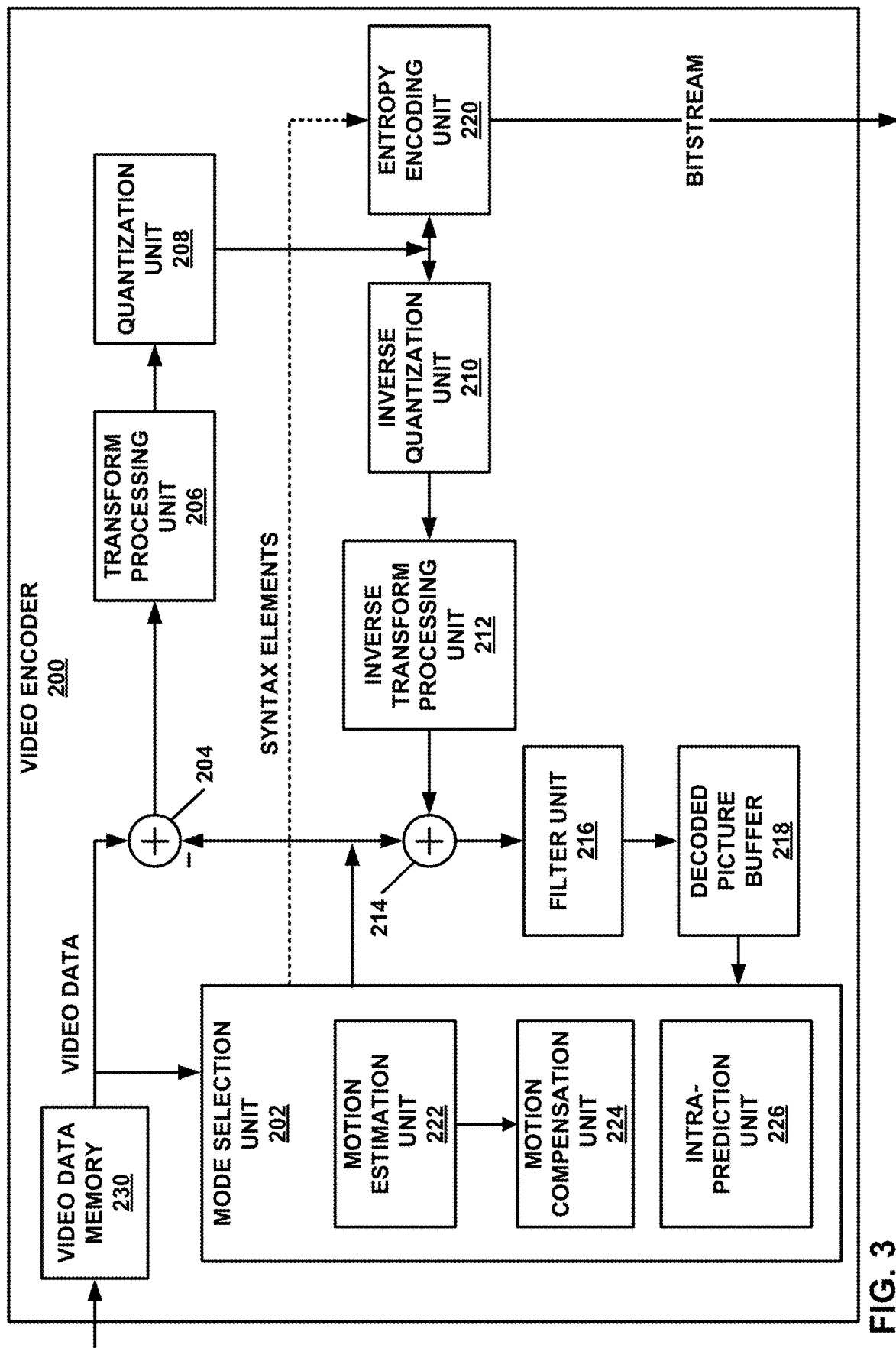
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC video coding standard and the VVC/H.266 video coding standard in development. However, the techniques of this disclosure are not limited to these video coding standards and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that define the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including a memory configured to store video data, and one or more processors implemented in circuitry and configured to modify, based on chroma phase shifts in a horizontal direction, a horizontal component of a chroma location pointed to by a motion vector of a current block of a current picture. The chroma location is in a reference picture that has a different resolution or a different chroma sampling type from the current picture. The one or more processors may also modify, based on chroma phase shifts in a vertical direction, a vertical component of the chroma location. Furthermore, the one or more processors may generate, based on chroma samples of the reference picture corresponding to a modified chroma location, chroma samples of a prediction block for the current block. The modified chroma location is defined by the modified horizontal and vertical components of the chroma location. The one or more processors of video encoder 200 may encode the current block based on the prediction block for the current block.

In some examples, video encoder 200 represents an example of a video encoding device including a memory configured to store video data, and one or more processors implemented in circuitry and configured to modify, based on luma phase shifts in a horizontal direction, a horizontal component of a luma location pointed to by a current block of a current picture. The reference picture has a different resolution or a different chroma sampling type from the current picture. The one or more processors may also modify, based on luma phase shifts in a vertical direction, a vertical component of the luma location. Furthermore, the one or more processors may generate, based on luma samples of the reference picture corresponding to a modified luma location, luma samples of a prediction block for the current block. The modified luma location is defined by the modified horizontal and vertical components of the luma location. The one or more processors of video encoder 200 may encode the current block based on the prediction block for the current block.

Figure 4:
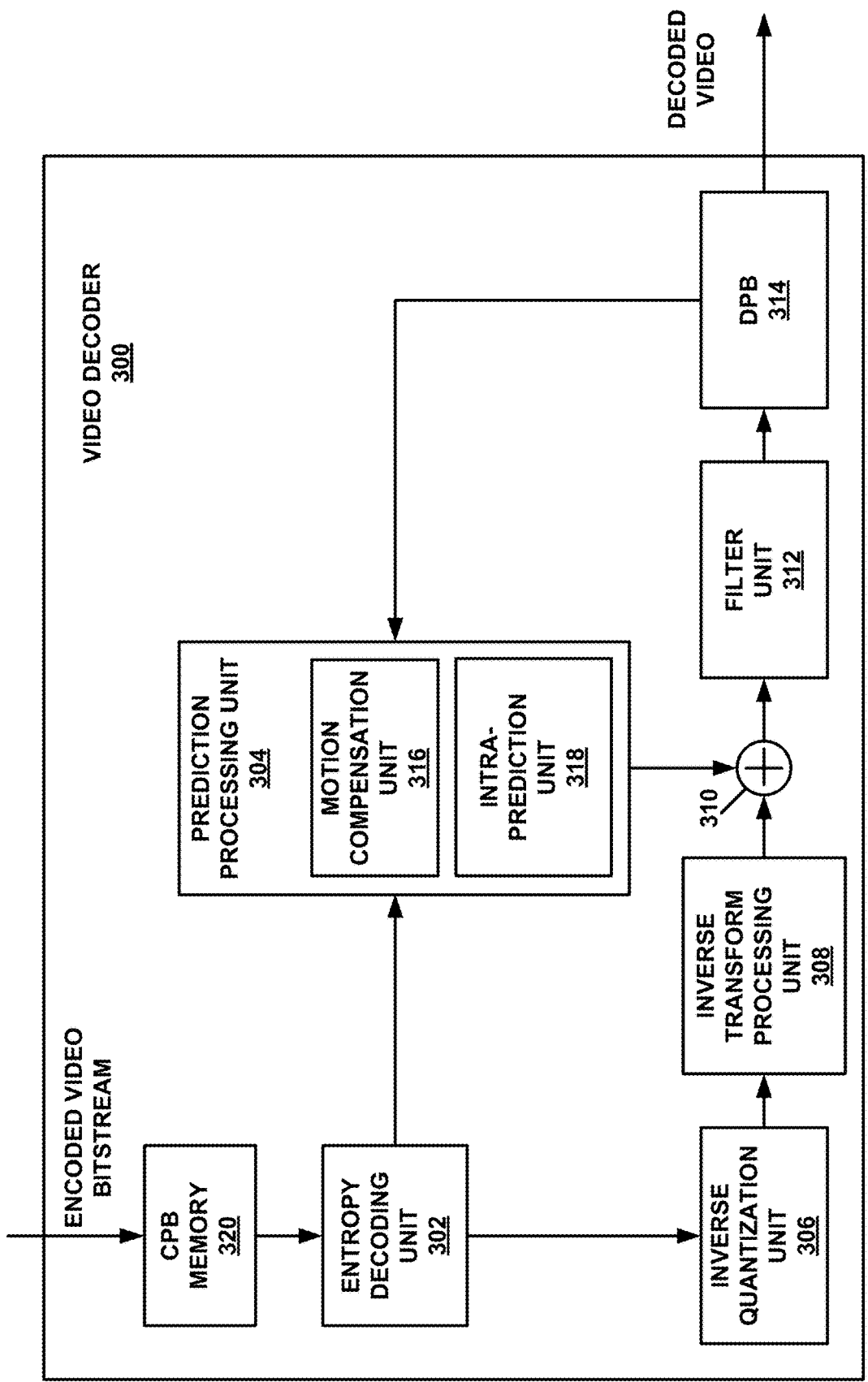
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 according to the techniques of VVC, and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processors units implemented in circuitry and configured to modify, based on chroma phase shifts in a horizontal direction, a horizontal component of a chroma location pointed to by a motion vector of a current block of a current picture of the video data, wherein the chroma location is in a reference picture that has a different resolution or a different chroma sampling type from the current picture. The one or more processors may also modify, based on chroma phase shifts in a vertical direction, a vertical component of the chroma location. Furthermore, the one or more processors may generate, based on chroma samples of the reference picture corresponding to a modified chroma location, chroma samples of a prediction block for the current block. The modified chroma location is defined by the modified horizontal and vertical components of the chroma location. The one or more processors of video decoder 300 may decode the current block based on the prediction block for the current block.

In some examples, video decoder 300 represents an example of a video decoding device including a memory configured to store video data, and one or more processing units implemented in circuitry and configured to modify, based on luma phase shifts in a horizontal direction, a horizontal component of a luma location pointed to by a current block of a current picture. The reference picture has a different resolution or a different chroma sampling type from the current picture. The one or more processors may also modify, based on luma phase shifts in a vertical direction, a vertical component of the luma location. Furthermore, the one or more processors may generate, based on luma samples of the reference picture corresponding to a modified luma location, luma samples of a prediction block for the current block. The modified luma location is defined by the modified horizontal and vertical components of the luma location. The one or more processors of video decoder 300 may decode the current block based on the prediction block for the current block.

Figure 5:
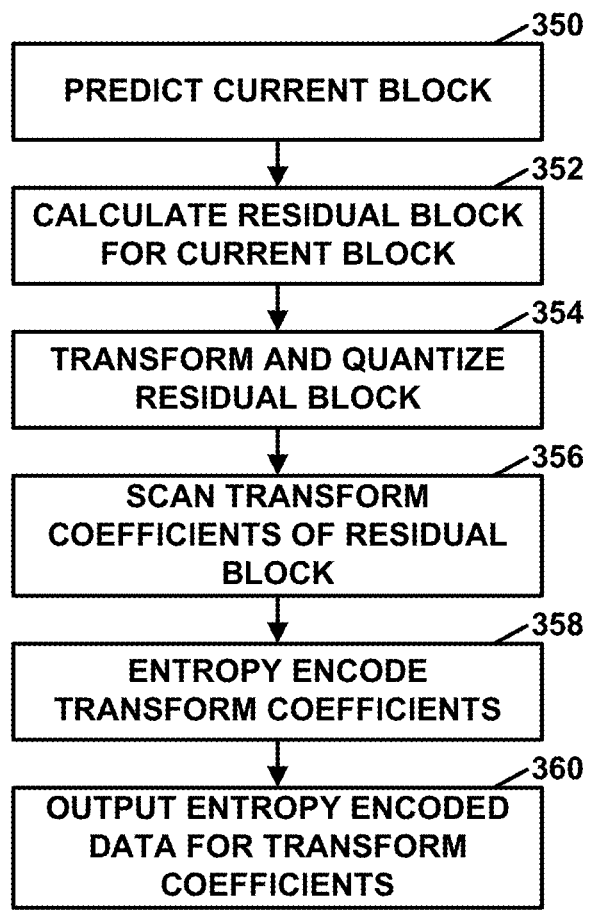
FIG. 5 is a flowchart illustrating an example method for encoding a current block in accordance with one or more techniques of this disclosure.

FIG. 5 is a flowchart illustrating an example method for encoding a current block. The current block may comprise a current CU. Although described with respect to video encoder 200 (FIGS. 1 and 3), it should be understood that other devices may be configured to perform a method similar to that of FIG. 5.

In this example, video encoder 200 initially predicts the current block (350). For example, video encoder 200 may form a prediction block for the current block. In accordance with one or more techniques of this disclosure, in examples where video encoder 200 predicts the current block using inter prediction from a reference picture having a different resolution or chroma sampling type from the current picture, video encoder 200 may modify, based on chroma phase shifts in a horizontal direction, a horizontal component of a chroma location pointed to by a motion vector of the current block. The chroma location is in a reference picture may have a different resolution or a different chroma sampling type from the current picture. Additionally, video encoder 200 may modify, based on chroma phase shifts in a vertical direction, a vertical component of the chroma location. Video encoder 200 may also generate, based on chroma samples of the reference picture corresponding to a modified chroma location, chroma samples of a prediction block for a current block of the current picture. The modified chroma location is defined by the modified horizontal and vertical components of the chroma location.

In some examples, video encoder 200 may modify, based on luma phase shifts in a horizontal direction, a horizontal component of a luma location pointed to by a current block of a current picture. The reference picture may have a different resolution or a different chroma sampling type from the current picture. Video encoder 200 may also modify, based on luma phase shifts in a vertical direction, a vertical component of the luma location. Furthermore, video encoder 200 may generate, based on luma samples of the reference picture corresponding to a modified luma location, luma samples of a prediction block for the current block. The modified luma location is defined by the modified horizontal and vertical components of the luma location.

Video encoder 200 may then calculate a residual block for the current block (352). To calculate the residual block, video encoder 200 may calculate a difference between the original, unencoded block and the prediction block for the current block. Video encoder 200 may then transform and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may then output the entropy encoded data of the block (360).

Figure 6:
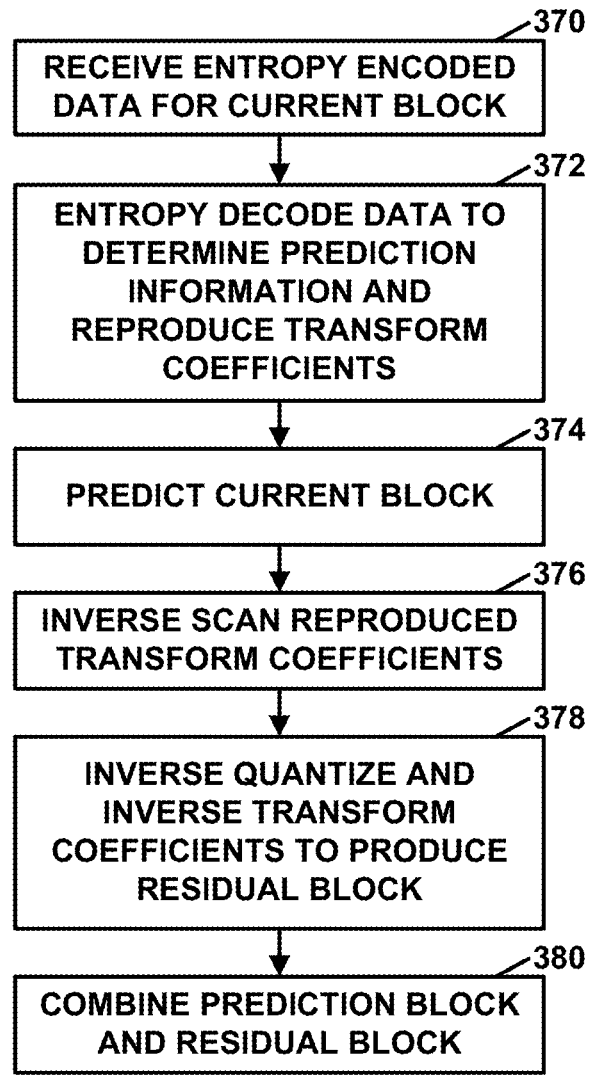
FIG. 6 is a flowchart illustrating an example method for decoding a current block of video data in accordance with one or more techniques of this disclosure.

FIG. 6 is a flowchart illustrating an example method for decoding a current block of video data. The current block may comprise a current CU. Although described with respect to video decoder 300 (FIGS. 1 and 4), it should be understood that other devices may be configured to perform a method similar to that of FIG. 6.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may predict the current block (374), e.g., using an intra- or inter-prediction mode as indicated by the prediction information for the current block, to calculate a prediction block for the current block.

In accordance with one or more techniques of this disclosure, in examples where video decoder 300 predicts the current block using inter prediction from a reference picture that may have a different resolution or chroma sampling type from the current picture, video decoder 300 may modify, based on chroma phase shifts in a horizontal direction, a horizontal component of a chroma location pointed to by a motion vector of the current block. Additionally, video decoder 300 may modify, based on chroma phase shifts in a vertical direction, a vertical component of the chroma location. Video decoder 300 may also generate, based on chroma samples of the reference picture corresponding to a modified chroma location, chroma samples of a prediction block for a current block of the current picture. The modified chroma location is defined by the modified horizontal and vertical components of the chroma location.

In some examples, video decoder 300 may modify, based on luma phase shifts in a horizontal direction, a horizontal component of a luma location pointed to by a current block of a current picture. The reference picture may have a different resolution or a different chroma sampling type from the current picture. Video decoder 300 may also modify, based on luma phase shifts in a vertical direction, a vertical component of the luma location. Furthermore, video decoder 300 may generate, based on luma samples of the reference picture corresponding to a modified luma location, luma samples of a prediction block for the current block. The modified luma location is defined by the modified horizontal and vertical components of the luma location.

Video decoder 300 may then inverse scan the reproduced transform coefficients (376), to create a block of quantized transform coefficients. Video decoder 300 may then inverse quantize and inverse transform the transform coefficients to produce a residual block (378). Video decoder 300 may ultimately decode the current block by combining the prediction block and the residual block (380).

Figure 7:
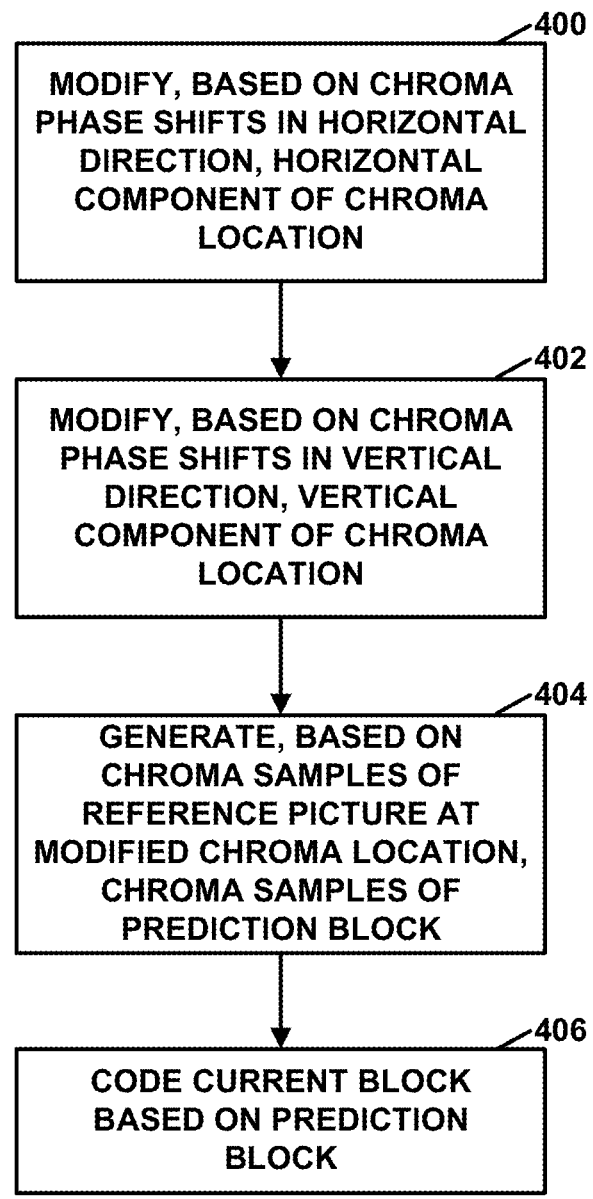
FIG. 7 is a flowchart illustrating an example method of coding video data in accordance with one or more techniques of this disclosure.

FIG. 7 is a flowchart illustrating an example method of coding video data in accordance with one or more techniques of this disclosure. The method of FIG. 7 may be performed by a video coder, such as video encoder 200 or video decoder 300.

In the example of FIG. 7, the video coder may modify, based on chroma phase shifts in a horizontal direction, a horizontal component of a chroma location pointed to by a motion vector of a current block of a current picture of the video data (400). Furthermore, the video coder may modify, based on chroma phase shifts in a vertical direction, a vertical component of the chroma location (402). In some examples, the chroma phase shifts in the horizontal direction and the chroma phase shifts in the vertical direction are signaled in a parameter set. In some examples, the video coder may modify the horizontal and vertical components of the chroma location during a motion compensation process.

In this example, the reference picture and a current picture have different resolution or chroma sampling type/phase shifts. For instance, as an example of the reference picture and the current picture having different resolutions, the chroma samples of the reference picture may be formatted according to a 4:2:0 chroma format and the chroma samples of the current picture may be formatted according to a 4:4:4 chroma format. As an example of the reference picture and the current picture having chroma sampling types, the chroma samples of the reference picture may be type 0 and the chroma samples of the current picture may be type 1. For instance, chroma phase shifts in the horizontal direction and the chroma phase shifts in the vertical direction are signaled in a parameter set.

In some examples, to modify the horizontal component of the motion vector and the vertical component of the motion vector, the video coder may determine an initial horizontal component of the chroma location. In the example of Table 2, the initial horizontal component of the chroma location may be equal to (((xSb/SubWidthC<<5)+mvLX[0])*hori_scale_fp). Furthermore, the video coder may determine a horizontal addition value (e.g., addX) based on the chroma phase shifts in the horizontal direction. The video coder may then determine the modified horizontal component of the chroma location (e.g., $refx_C$) by adding the initial horizontal component of the chroma location and the horizontal addition value. In this way, the video coder may effectively modify a horizontal component of an initial motion vector (mvLX) of the current block to determine a horizontal component of a motion vector that indicates an actual location in the reference picture for generation of the prediction block. Similarly, to modify the vertical component of the chroma location, the video coder may determine an initial vertical component of the chroma location pointed to by the motion vector. In the example of Table 2, the initial vertical component of the chroma location may be equal to (((ySb/SubHeightC<<5)+mvLX[1])*vert_scale_fp). Furthermore, the video coder may determine a vertical addition value (e.g., addY) based on the chroma phase shifts in the vertical direction. The video coder may determine the modified vertical component of the chroma location (e.g., $refy_C$) by adding the initial vertical component of the chroma location and the vertical addition value. In this way, the video coder may effectively modify a vertical component of the initial motion vector (mvLX) of the current block to determine a vertical component of a motion vector that indicates an actual location in the reference picture for generation of the prediction block. In some examples, to set the horizontal addition value, the video coder may multiply the chroma phase shifts in the horizontal direction by a value equal to the horizontal scaling ratio minus (1<<14) and set the vertical addition value comprises multiplying the chroma phase shifts in the vertical direction by a value equal to the vertical scaling ratio minus (1<<14) (e.g., as shown in the example of Tables 3-8.

As described in the previous paragraph, the video coder may determine a horizontal addition value (e.g., addX) and a vertical addition value (e.g., addY). In some examples, to determine the horizontal addition value, the video coder may determine whether a horizontal scaling ratio is equal to a 1× ratio, whether a vertical scaling ratio is equal to the 1× ratio, whether a chroma format indicator (e.g., chroma_format_idc) indicates that the reference picture is monochrome, and whether the reference picture is coded using a 4:4:4 chroma format. In such examples, based on the horizontal scaling ratio not being equal to a 1× ratio and the chroma format indicator indicating that the reference picture is not monochrome and not coded using a 4:4:4 chroma format, the video coder may set the horizontal addition value based on the chroma phase shifts in the horizontal direction. Similarly, based on the vertical scaling ratio not being equal to the 1× ratio and the chroma format indicator indicating that the reference picture is not monochrome, the reference picture is not coded using a 4:4:4 chroma format and the reference picture is not coded using the 4:2:2 chroma format, setting the vertical addition value based on the chroma phase shifts in the vertical direction. Thus, the chroma phase shift information may only be considered when resampling is applied, i.e., hori_scale_fp or vert_scale_fp is different from a 1× ratio and the techniques of this disclosure are not applied for vertical filtering for 4:2:2 format or not applied for both horizontal and vertical filtering for 4:4:4 format or monochrome format.

Additionally, the video coder may generate, based on chroma samples of the reference picture corresponding to the location in the reference picture indicated by the motion vector, chroma samples of a prediction block for a current block of the current picture (404). For example, the video coder may apply an interpolation filter to samples of the reference picture to interpolate a sample of the prediction block for the location indicated by the motion vector and, similarly interpolate samples of the prediction block having offsets relative to samples of the reference picture corresponding to an offset of location indicated by the motion vector.

The video coder may code the current block based on the prediction block for the current block (406). For instance, in examples where the video coder is a video encoder (e.g., video encoder 200), coding may refer to encoding and the coding the current block may include generating chroma residual samples for the current block based on differences between the chroma samples of the prediction block for the current block and corresponding chroma samples of the current block. In examples where the video coder is a video decoder (e.g., video decoder 300), coding may refer to decoding and coding the current block may include reconstructing chroma samples of the current block by adding the chroma samples of the prediction block for the current block and corresponding chroma residual samples of the current block.

The following is a non-exclusive list of examples that are in accordance with one or more techniques of this disclosure:

Example 1. A method of coding video data, the method comprising: determining, based on chroma phase shifts in a horizontal direction, a horizontal component of a motion vector that indicates a location in a reference picture, wherein the reference picture and a current picture have different resolutions; determining, based on chroma phase shifts in a vertical direction, a vertical component of the motion vector; generating, based on chroma samples of the reference picture corresponding to the location in the reference picture indicated by the motion vector, chroma samples of a prediction block for a current block of the current picture; and coding the current block based on the prediction block for the current block.

Example 2. The method of example 1, wherein the chroma phase shifts in the horizontal direction and the chroma phase shifts in the vertical direction are signaled in a parameter set.

Example 3. The method of any of examples 1-2, wherein coding comprises decoding.

Example 4. The method of example 4, wherein coding the current block comprises reconstructing chroma samples of the current block by adding the chroma samples of the prediction block for the current block and corresponding chroma residual samples of the current block.

Example 5. The method of any of examples 1-2, wherein coding comprises encoding.

Example 6. The method of example 5, wherein coding the current block comprises generating chroma residual samples for the current block based on differences between the chroma samples of the prediction block for the current block and corresponding chroma samples of the current block.

Example 7. A method of coding video data, the method comprising: determining, based on luma phase shifts in a horizontal direction, a horizontal component of a motion vector that indicates a location in a reference picture, wherein the reference picture and a current picture have different resolutions; determining, based on luma phase shifts in a vertical direction, a vertical component of the motion vector; generating, based on luma samples of the reference picture corresponding to the location in the reference picture indicated by the motion vector, luma samples of a prediction block for a current block of the current picture; and coding the current block based on the prediction block for the current block.

Example 8. The method of example 7, wherein the luma phase shifts in the horizontal direction and the luma phase shifts in the vertical direction are signaled in a parameter set.

Example 9. The method of any of examples 7-8, wherein coding comprises decoding.

Example 10. The method of example 9, wherein coding the current block comprises reconstructing luma samples of the current block by adding the luma samples of the prediction block for the current block and corresponding luma residual samples of the current block.

Example 11. The method of any of examples 7-8, wherein coding comprises encoding.

Example 12. The method of example 11, wherein coding the current block comprises generating luma residual samples for the current block based on differences between the luma samples of the prediction block for the current block and corresponding luma samples of the current block.

Example 13. A device for coding video data, the device comprising one or more means for performing the method of any of examples 1-12.

Example 14. The device of example 13, wherein the one or more means comprise one or more processors implemented in circuitry.

Example 15. The device of any of examples 13 and 14, further comprising a memory to store the video data.

Example 16. The device of any of examples 13-15, further comprising a display configured to display decoded video data.

Example 17. The device of any of examples 13-16, wherein the device comprises one or more of a camera, a computer, a mobile device, a broadcast receiver device, or a set-top box.

Example 18. The device of any of examples 13-17, wherein the device comprises a video decoder.

Example 19. The device of any of examples 13-18, wherein the device comprises a video encoder.

Example 20. A computer-readable storage medium having stored thereon instructions that, when executed, cause one or more processors to perform the method of any of examples 1-12.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
    determining, based on chroma phase shifts in a horizontal direction, a modified horizontal component of a chroma location pointed to by a motion vector of a current block of a current picture of the video data, wherein the chroma location is in a reference picture that has a different resolution or a different chroma sampling type from the current picture, wherein determining the modified horizontal component of the chroma location comprises:
        determining an initial horizontal component of the chroma location;
        determining a horizontal addition value based on the chroma phase shifts in the horizontal direction; and
        determining the modified horizontal component of the chroma location based on adding the initial horizontal component of the chroma location and the horizontal addition value;
    determining, based on chroma phase shifts in a vertical direction, a modified vertical component of the chroma location, wherein determining the modified vertical component of the chroma location comprises:
        determining an initial vertical component of the chroma location;
        determining a vertical addition value based on the chroma phase shifts in the vertical direction; and
        determining the modified vertical component of the chroma location based on adding the initial vertical component of the chroma location and the vertical addition value;
    generating, based on chroma samples of the reference picture corresponding to a modified chroma location, chroma samples of a prediction block for the current block, wherein the modified chroma location is defined by the modified horizontal and vertical components of the chroma location; and coding the current block based on the prediction block for the current block.

2. The method of claim 1, wherein the chroma phase shifts in the horizontal direction and the chroma phase shifts in the vertical direction are signaled in a parameter set.

3. The method of claim 1, wherein:
determining the horizontal addition value comprises:
based on a horizontal scaling ratio not being equal to a 1× ratio and a chroma format indicator indicating that the reference picture is not monochrome and not coded using a 4:4:4 chroma format, setting the horizontal addition value based on the chroma phase shifts in the horizontal direction, and
determining the vertical addition value comprises:
based on a vertical scaling ratio not being equal to the 1× ratio and the chroma format indicator indicating that the reference picture is not monochrome, the reference picture not being coded using the 4:4:4 chroma format and the reference picture not being coded using the 4:2:2 chroma format, setting the vertical addition value based on the chroma phase shifts in the vertical direction.

4. The method of claim 3, wherein:
setting the horizontal addition value comprises multiplying the chroma phase shifts in the horizontal direction by a value equal to the horizontal scaling ratio minus (1<<14), and
setting the vertical addition value comprises multiplying the chroma phase shifts in the vertical direction by a value equal to the vertical scaling ratio minus (1<<14).

5. The method of claim 1, wherein coding comprises decoding.

6. The method of claim 5, wherein coding the current block comprises reconstructing chroma samples of the current block by adding the chroma samples of the prediction block for the current block and corresponding chroma residual samples of the current block.

7. The method of claim 1, wherein coding comprises encoding.

8. The method of claim 7, wherein coding the current block comprises generating chroma residual samples for the current block based on differences between the chroma samples of the prediction block for the current block and corresponding chroma samples of the current block.

9. The method of claim 1, wherein:
determining the modified horizontal component of the chroma location comprises determining the modified horizontal component of the chroma location during a motion compensation process, and
determining the modified vertical component of the chroma location comprises determining the modified vertical component of the chroma location during the motion compensation process.

10. A device for coding video data, the device comprising:
a memory configured to store the video data; and
one or more processors implemented in circuitry, the one or more processors configured to:
determine, based on chroma phase shifts in a horizontal direction, a modified horizontal component of a chroma location pointed to by a motion vector of a current block of a current picture of the video data, wherein the chroma location is in a reference picture, wherein the chroma location is in a reference picture that has a different resolution or a different chroma sampling type from the current picture, wherein the one or more processors are configured to, as part of determining the modified horizontal component of the chroma location:
determine an initial horizontal component of the chroma location pointed to by the motion vector;
determine a horizontal addition value based on the chroma phase shifts in the horizontal direction; and
determine the modified horizontal component of the chroma location by adding the initial horizontal component of the chroma location and the horizontal addition value;
determine, based on chroma phase shifts in a vertical direction, a modified vertical component of the chroma location;
generate, based on chroma samples of the reference picture corresponding to a modified chroma location, chroma samples of a prediction block for the current block, wherein the modified chroma location is defined by the modified horizontal and vertical components of the chroma location, wherein the one or more processors are configured to, as part of determining the modified vertical component of the chroma location:
determine an initial vertical component of the chroma location;
determine a vertical addition value based on the chroma phase shifts in the vertical direction; and
determine the modified vertical component of the chroma location by adding the initial vertical component of the chroma location and the vertical addition value; and
code the current block based on the prediction block for the current block.

11. The device of claim 10, wherein the chroma phase shifts in the horizontal direction and the chroma phase shifts in the vertical direction are signaled in a parameter set.

12. The device of claim 10, wherein:
the one or more processors are configured to, as part of determining the horizontal addition value:
based on a horizontal scaling ratio not being equal to a 1× ratio and a chroma format indicator indicating that the reference picture is not monochrome and not coded using a 4:4:4 chroma format, set the horizontal addition value based on the chroma phase shifts in the horizontal direction, and
the one or more processors are configured to, as part of determining the vertical addition value:
based on a vertical scaling ratio not being equal to the 1× ratio and the chroma format indicator indicating that the reference picture is not monochrome, the reference picture not being coded using the 4:4:4 chroma format and the reference picture not being coded using the 4:2:2 chroma format, set the vertical addition value based on the chroma phase shifts in the vertical direction.

13. The device of claim 12, wherein:
the one or more processors are configured to, as part of setting the horizontal addition value, multiply the chroma phase shifts in the horizontal direction by a value equal to the horizontal scaling ratio minus (1<<14), and
the one or more processors are configured to, as part of setting the vertical addition value, multiply the chroma phase shifts in the vertical direction by a value equal to the vertical scaling ratio minus (1<<14).

14. The device of claim 10, wherein the device comprises a video decoder.

15. The device of claim 14, wherein the video decoder is configured to, as part of coding the current block, reconstruct chroma samples of the current block by adding the chroma samples of the prediction block for the current block and corresponding chroma residual samples of the current block.

16. The device of claim 10, wherein device comprises a video encoder.

17. The device of claim 16, wherein the video encoder is configured to, as part of coding the current block, generate chroma residual samples for the current block based on differences between the chroma samples of the prediction block for the current block and corresponding chroma samples of the current block.

18. The device of claim 10, further comprising a display configured to display decoded video data.

19. The device of claim 10, wherein the device comprises one or more of a camera, a computer, a mobile device, a broadcast receiver device, or a set-top box.

20. The device of claim 10, wherein:
the one or more processors are configured to determine the modified horizontal component of the chroma location during a motion compensation process, and
the one or more processors are configured to determine the modified vertical component of the chroma location during the motion compensation process.

21. A non-transitory computer-readable storage medium having stored thereon instructions that, when executed, cause one or more processors to:
determine, based on chroma phase shifts in a horizontal direction, a modified horizontal component of a chroma location of a motion vector of a current block of a current picture of the video data, wherein the chroma location is in a reference picture that has a different resolution or a different chroma sampling type from the current picture, wherein the instructions that cause the one or more processors to determine the modified horizontal component of the chroma location comprise instructions that, when executed, cause the one or more processors to:
  determine an initial horizontal component of the chroma location;
  determine a horizontal addition value based on the chroma phase shifts in the horizontal direction; and
  determine the modified horizontal component of the chroma location based on adding the initial horizontal component of the chroma location and the horizontal addition value;
determine, based on chroma phase shifts in a vertical direction, a modified vertical component of the motion vector, wherein the instructions that cause the one or more processors to determine the modified vertical component of the chroma location comprise instructions that, when executed, cause the one or more processors to:
  determine an initial vertical component of the chroma location;
  determine a vertical addition value based on the chroma phase shifts in the vertical direction; and
  determine the modified vertical component of the chroma location based on adding the initial vertical component of the chroma location and the vertical addition value;
generate, based on chroma samples of the reference picture corresponding to the location in the reference picture indicated by the motion vector, chroma samples of a prediction block for a current block of the current picture; and
code the current block based on the prediction block for the current block.

* * * * *